United States Patent [19]
Rode

[11] Patent Number: 5,329,196

[45] Date of Patent: Jul. 12, 1994

[54] METAL WRAPPED NON-METALLIC MAGNETIC COMPONENT FOR USE ABOUT A ROTOR OR A SHAFT AND METHOD OF MAKING THE SAME

[75] Inventor: John E. Rode, Fonda, N.Y.

[73] Assignee: Temper Corporation, Fonda, N.Y.

[21] Appl. No.: 58,862

[22] Filed: May 10, 1993

Related U.S. Application Data

[62] Division of Ser. No. 758,907, Sep. 11, 1991, Pat. No. 5,224,259.

[51] Int. Cl.⁵ .............................................. H02K 21/12
[52] U.S. Cl. ..................................... 310/156; 29/598
[58] Field of Search ............. 310/40 MM, 42, 46, 152, 310/156, 261, 267; 29/598

[56] References Cited

U.S. PATENT DOCUMENTS

| | | | |
|---|---|---|---|
| 4,529,900 | 7/1985 | Uzuka | 310/156 |
| 4,625,135 | 11/1986 | Kasabian | 310/156 |
| 4,695,419 | 9/1987 | Inariba | 29/598 |
| 4,949,000 | 8/1990 | Petersen | 310/156 |

OTHER PUBLICATIONS

3M Electrical Specialities Division, Data Sheet, 3M Brand Magnet Material B-1030 "Prototyping for DC PM Motors and Brushless Motors with 3M Flexible Permanent Magnet Material" B-1030, 1990.

Primary Examiner—Steven L. Stephan
Assistant Examiner—Matthew Nguyen
Attorney, Agent, or Firm—Heslin & Rothenberg

[57] ABSTRACT

A system of manufacturing a metal wrapped non-metallic magnetic component useable about a rotor or the like comprises welding the ends of a strip of sheet metal to form a cylinder. If necessary, the cylinder may be cut about its entire circumference at two axial locations thereby isolating a central portion of the cylinder having exposed a first axial end and a second axial end. The cylinder is then form rolled to deform the first and second axial ends radially inward to form a channel located along the inner diameter. The magnetic material may then be inserted within the channel between a deformed first and second axial ends of the central cylindrical portion. The central cylindrical portion may then be form rolled such that the flanges are folded about the ends of the magnetic material.

4 Claims, 4 Drawing Sheets

METAL WRAPPED NON-METALLIC MAGNETIC COMPONENT FOR USE ABOUT A ROTOR OR A SHAFT AND METHOD OF MAKING THE SAME

CROSS REFERENCE TO RELATED APPLICATION

This application is a divisional of U.S. patent application Ser. No. 07/758,907 filed on Sep. 11, 1991, U.S. Pat. No. 5,224,259.

BACKGROUND OF THE INVENTION

This invention relates to the field of magnetic rotors and shafts used to impart a rotating magnetic field and, more particularly, to a metal wrapped non-metallic magnetic rotor and method of making the same.

Various machines commonly require a rotating magnetic field in order to function as intended. For example, electric motors or magnetic drives commonly utilize magnetic rotors in their operation. One technique for magnetizing a rotor is to manufacture the rotor itself out of a magnetic material. However, it is also possible to manufacture the rotor out of a metallic material and affix a magnetic material, such as a magnetized plastic, on the outer diameter of the rotor to impart magnetic properties.

It is therefore an object of the present invention to provide a metal wrapped non-metallic magnetic component capable of use about a rotor and/or shaft to magnetize the rotor and/or shaft.

It is also an object of the present invention to provide an efficient method of making a metal wrapped non-metallic magnetic component capable of use about a rotor and/or shaft.

SUMMARY OF THE INVENTION

The aforementioned objects may be achieved through use of the metal wrapped non-metallic magnetic component and method of making the same. The method comprises welding the ends of a predetermined strip of metal to form a cylinder of metal, form rolling the cylinder to deform a first axial end and a second axial end thereof radially inward to form a channel located along the inner diameter of the cylinder defined between a first and second flange formed by the deformed first and second axial ends and a middle part of the cylinder, inserting the magnetic material within the channel wherein the outer diameter of the magnetic material contacts the inner diameter of the cylinder between the deformed first and second axial ends of the central cylindrical portion, form rolling the central cylindrical portion such that the flanges are folded about the ends of the magnetic material to contact an inner diameter of the magnetic material thereby forming a metal wrapped non-metallic magnetic cylindrical component. After welding the ends of the strip of metal together, the cylinder may be cut about its entire circumference at two axial locations thereby isolating a portion of the cylinder having exposed the first axial end and second axial end.

Form rolling the cylinder to deform the axial ends thereof radially inward to form a channel located along the inner diameter of the cylinder between a first and second flange formed by the deformed axial ends may be achieved by form rolling the cylinder to deform the existing ends thereof radially inwards at a first angle, and form rolling the cylinder to deform the axial ends thereof from a first angle to a second angle wherein the flanges are formed by the deformed existing ends extend radially inward and substantially perpendicular from the remaining portion of the cylinder.

Form rolling the cylinder so that the flanges are folded about the ends of the magnetic material may be achieved by form rolling the cylinder to deform the flanges into an intermediate position, and form rolling the cylinder to deform the flanges from the intermediate position to a final position wherein the flanges are folded about the ends of the magnetic material such that the outer tips of the flanges are substantially parallel with the middle part of the cylinder.

Form rolling the cylinder to deform the existing ends thereof radially inwards at a first angle may be achieved by form rolling during a first rolling stage. A first bottom form rolls and a first top form rolls may be used to perform the first rolling stage.

Form rolling the cylinder to deform the existing ends thereof to a second angle may be achieved by form rolling the cylinder during a second rolling stage. A second top form rolls and a second bottom form rolls may be used to perform the second rolling stage.

Form rolling the cylinder such that the flanges are folded about the ends of the magnetic material into an intermediate position may be achieved by form rolling in a third rolling stage. A third bottom form rolls and a third top form rolls may be used to perform the third rolling stage.

Form rolling the cylinder such that the flanges are folded about the ends of the magnetic material in a final position may include form rolling the cylinder portion during a fourth rolling stage. A fourth bottom form rolls and a third top form rolls may be used to perform the fourth rolling stage.

The form rolling stages are performed using a form rolling machine. Welding the ends of a predetermined strip of sheet metal may be performed by welding the ends of a strip of stainless steel.

The invention also incorporates a metal wrapped non-metallic magnetic component useable about a rotor or the like which includes a strip of sheet metal having its ends welded together to form a cylinder of sheet metal having a first and second axial end. The cylinder may be form rolled to form a channel defined by the inner diameter of the central cylindrical portion and a first and second flange formed by form rolling. The channel has a non-metallic magnetic material inserted therein, the magnetic material being secured within the channel by form rolling the central cylindrical portion such that the flanges are folded about the ends of the magnetic material to contact an inner diameter of the magnetic material.

DETAILED DESCRIPTION

Figure 2:
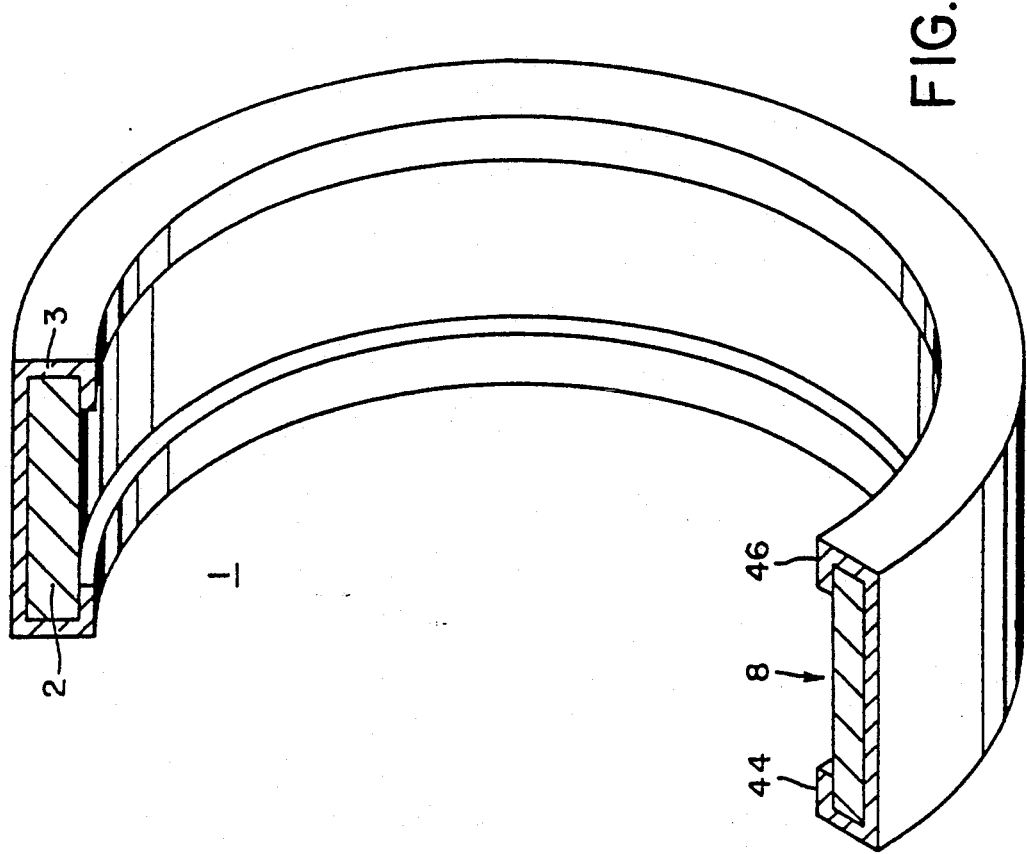
FIG. 2 depicts a sectional view of a cylindrically shaped metal wrapped non-metallic magnetic component mountable on a rotor manufactured in accordance with the principles of the present invention.

Referring to FIG. 2, a portion of a metal wrapped non-metallic magnetic cylindrically shaped component 1 mountable on a rotor, shaft or the like is shown. The component 1 contains a metal shell 3, preferably made of stainless steel or some other sheet metal, wrapped about a non-metallic magnetic material 2 such as a magnetized plastic.

Figure 1:
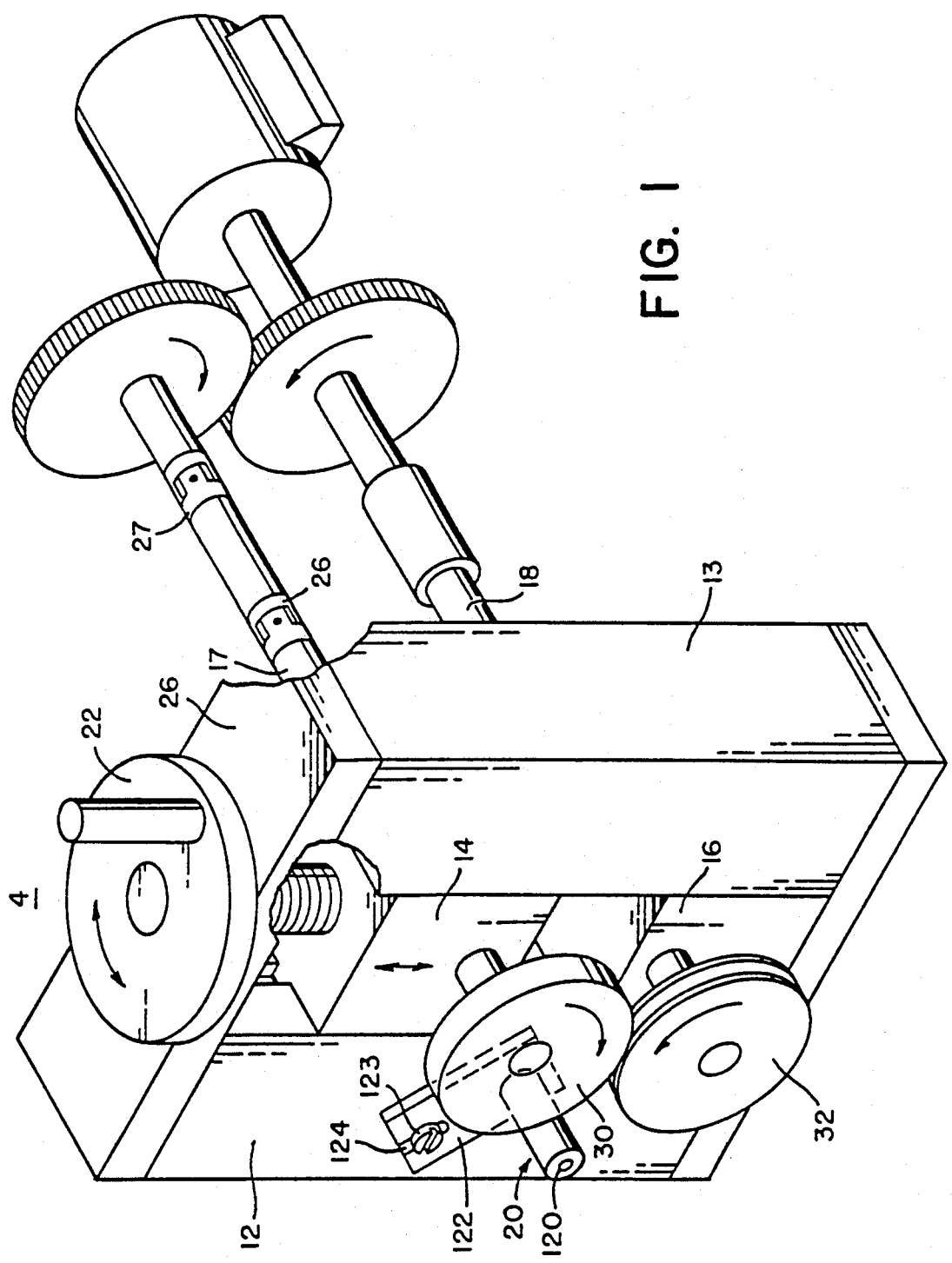
FIG. 1 depicts an isometric view of a form rolling apparatus useable for making a metal wrapped non-metallic magnetic component for use on a rotor or the like in accordance with the principles of the present invention.

The component is manufactured using a form rolling machine such as the type depicted in FIG. 1. The form rolling machine, generally denoted 4 contains a pair of vertical machine columns 12, 13 on both sides of an upper roll housing 14 and lower roll housing 16. The upper roll housing 14 contains an upper roll shaft 17 extending therethrough, and the lower roll housing 16 contains a lower roll shaft 18 extending therethrough. One of the machine columns 12 contains a guide means 20 which is pivotable and slidable relative to the machine column 12. The upper roll housing 14 is connected to a hand wheel 22 by means of a lead screw 24 threaded through a top plate 26. Rotation of the hand wheel turns the lead screw, which is rotatable relative to the upper roll housing 14, and therefore varies the height of the upper roll housing relative to the lower roll housing 16. The upper roll shaft 17 and lower roll shaft 18 are each connected to a drive means which rotates the shafts in opposite directions. Various types of drive means may suffice so long as the upper roll shaft 17 rotates in a direction opposite to the lower roll shaft 18. Universal joints 26, 27 are incorporated on the upper roll shaft 17 to allow the shaft to move vertically while rotating. Although not shown, the lower roll shaft 18 may also contain one or more universal joints.

The roll shafts 17, 18 are capable of supporting form rolls 30, 32 which may be affixed to the upper and lower roll shafts 17, 18 and rotated with the shaft. The form rolls comprise one or more disks having a circumference formed by a particular shaped outer diameter. Upper and lower form rolls are capable of being moved vertically relative to one other by manipulation of the hand wheel 22 which raises and lowers the upper roll housing 14 and upper roll shaft 17 (containing a top roll 32). The component 1 is manufactured in a series of form rolling stages. Each rolling stage involves the deformation of the metal cylinder 3 between a different combination of form rolls mounted on the upper and lower roll shafts 17, 18. Although one type of form rolling machine is discussed herein, it is apparent to one skilled in the art that other types of form rolling machines may suffice for use with the principles of the present invention.

Figure 3:
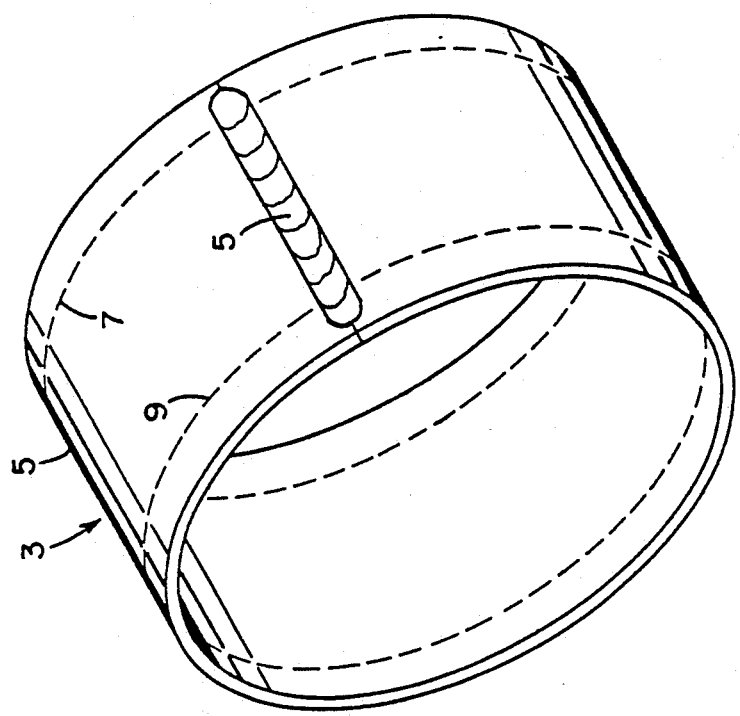
FIG. 3 depicts an isometric view of a cylindrically shaped piece of metal, steel, foil, or the like after being welded in accordance with the principles of the present invention.

The component may be made by welding a predetermined length, or strip, of steel together to form the cylindrical, or ring-shaped, member 3. Preferably, stainless steel may be used. However, other types of non-magnetic materials such as aluminum, etc. may suffice. Referring now to FIG. 3, the respective ends of the strip of metal may be welded together using any conventional welding technique to form the cylinder 3. For example, securing the metal in a copper clamping fixture and welding with a Linde Plasma Needle Arc Welder will suffice. However, the weld 5 may not extend across the entire surface of the cylinder. If this occurs, the resulting metal cylinder 3 may be cut about its circumference in two axial locations 7, 9 such that the ends of the cylinder which extend past the weld 5 are cut from a remaining central portion of the cylinder. This cutting is performed at the axial locations 7, 9 which correspond to the ends of the weld 5 such that the remaining portion 6 of the cylinder has the weld 5 extending throughout. The weld 5 should extend throughout the length of the cylinder to provide the cylinder with the optimum structural stability.

Figure 4:
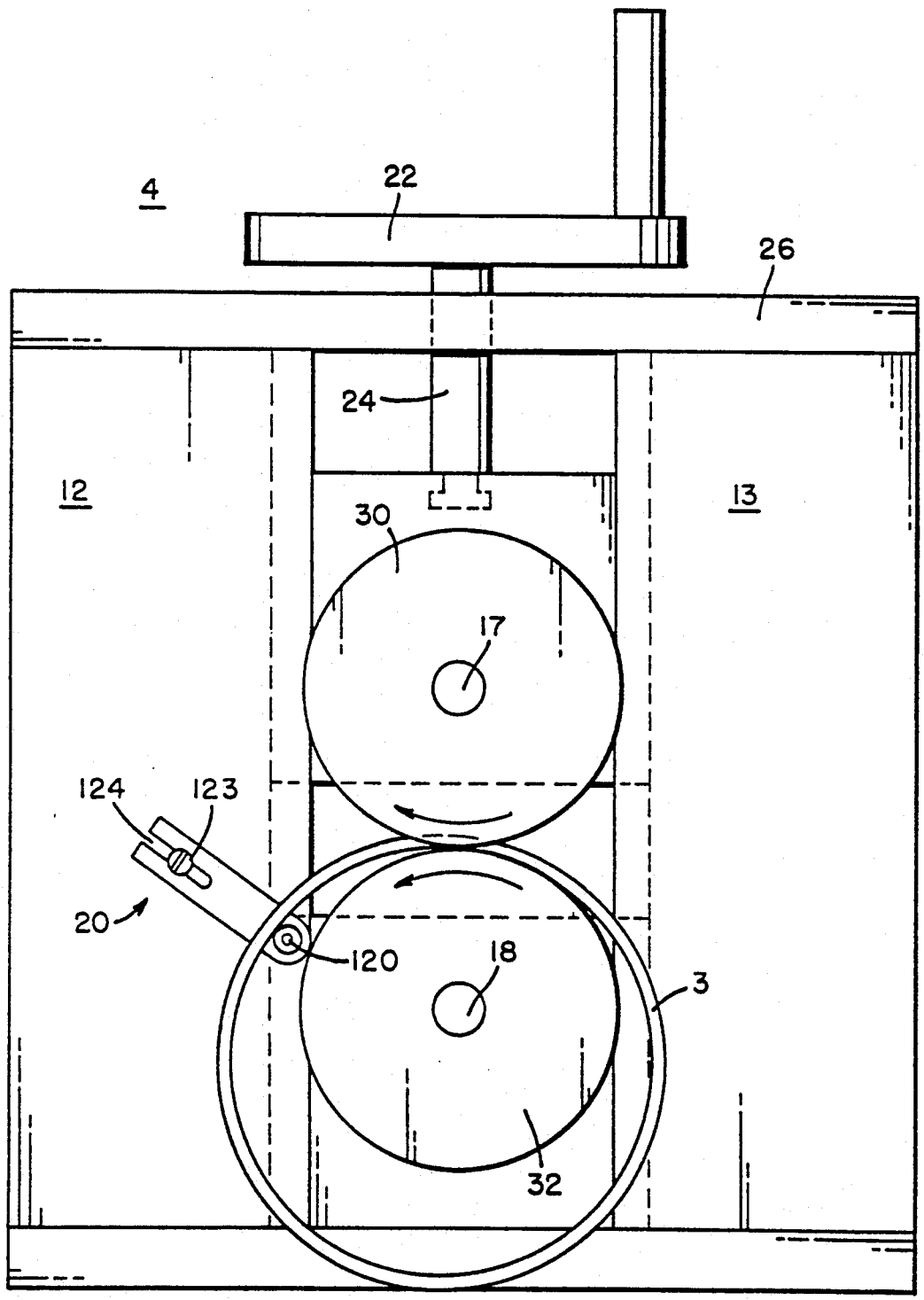
FIG. 4 depicts a front view of the form rolling apparatus depicted in FIG. 1.
Figure 5:
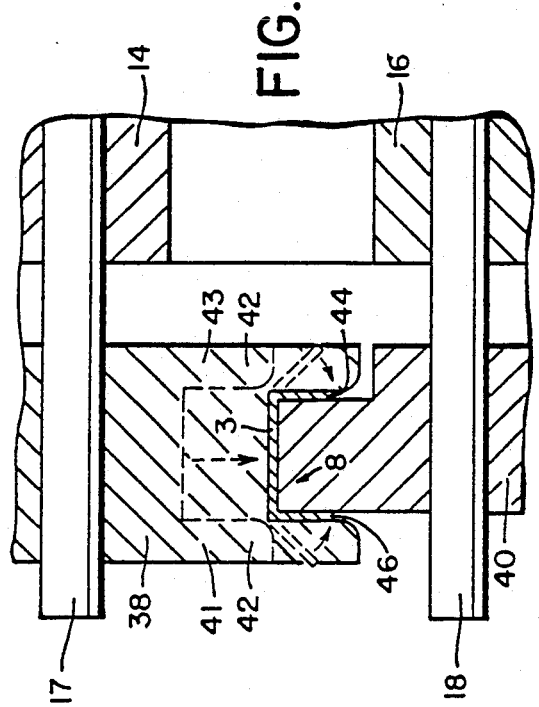
FIG. 5 depicts a sectional view of upper and lower form rolls mounted on the form rolling apparatus to perform a first rolling stage used in making the metal wrapped non-metallic magnetic component in accordance with the principles of the present invention.

The metal cylinder 3 may then be form rolled. The cylinder 3 is then placed between a first upper roll and first lower roll to be form rolled in a first stage on the form rolling machine depicted in FIG. 1. FIG. 5 depicts a sectional view of the interface between the first upper roll 30 and the first lower roll 32, and the metal cylinder 3 mounted therebetween, mounted on the form rolling machine 4. The cross-section of the first upper roll 30 and first lower roll 32 are configured as shown in FIG. 5. The first bottom roll 32 is mounted on the lower roll shaft 18 and the first upper roll 30 is mounted on the upper roll shaft 17. The metal cylinder 3 is supported by the lower form rolls 18 and guide means 20 (see FIG. 4). As shown in FIG. 4, the guide means 20 contains a roller 120 which is slidable relative to machine column 12 by means of a bracket 122 having a screw fastener 123 inserted into the column 12 through a groove 124 in the bracket. The roller may be mounted on the inside or outside of the metal cylinder 3 in order to allow the metal cylinder 3 to maintain proper shape and form.

Referring again to FIG. 5, the cross-section of the metal cylinder 3 is initially flat shaped when mounted on the lower roll 32 between end flanges 34 and 36. The lower roll is mounted between the end flanges. The drive means is activated such that the rolls 30, 32 rotate the hand wheel 22 is turned in the clockwise direction to lower the upper roll housing 14 and thereby lower the upper roll 30 into the position substantially shown in FIG. 5. By gradually lowering the upper roll 30 while the rolls 30, 32 are rotating, the shape of the metal cylinder 3, which also rotates between the rolls 30, 32, will be deformed into the cross-sectional configuration shown in FIG. 5. After the upper roll 30 has been lowered to its lowermost point (i.e., where no further lowering of the upper roll by the hand wheel is possible) the cross-section of the metal cylinder 3 will be shaped as shown in FIG. 5 and the first rolling stage completed.

Figure 6:
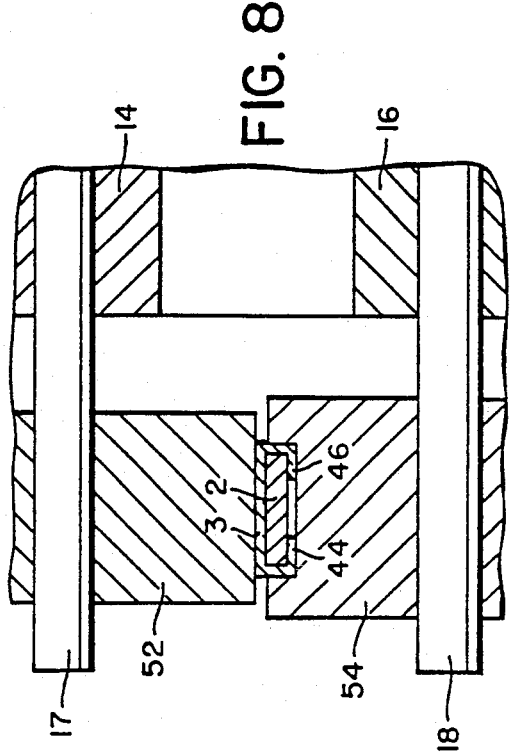
FIG. 6 depicts a sectional view of another set of upper and lower form rolls mounted on the form rolling apparatus to perform a second rolling stage used in making the steel wrapped non-metallic magnetic component in accordance with the principles of the present invention.

Using the form rolling apparatus of FIG. 1 in a manner similar to its use in the first rolling stage, a second rolling stage may be performed using a second top roll 38 and a second bottom roll 40. FIG. 6 depicts the second top roll 38 and second bottom roll 40 useable in the second rolling stage. The second top roll 38 contains a pair of end portions 41, 43 having a radius of curvature 42 which is typically fifteen tenths of the length of the radius of the metal cylinder 3. The metal cylinder 3 is mounted on the lower roll 40. By gradually lowering the second top roll 38 using the hand wheel 22 while the drive means rotates the rolls 38, 40, the second top roll 38 is lowered onto the second bottom roll 40 and the axial ends of the metal cylinder are deformed such that they form flanges 44, 46 which extend radially towards the bottom roll shaft and are perpendicular with the remaining portion of the metal cylinder. After the second top roll 38 is gradually lowered to its lowest position, the metal cylinder 3 will be configured as shown in FIG. 6 and the second rolling stage completed. After the second rolling stage is completed, the metal cylinder 3 will have a channel 8 extending along its inner diameter defined by the flanges 44, 46 which extend from the middle portion thereof.

After the second rolling stage is completed, the magnetic material may then be inserted into the channel 8 to form the component 1. The length of the magnetic material may be obtained by the following equation:

$$L_m = (D_s + T_m) \cdot \pi \cdot 1.005$$

where:
- $L_m$ = Length of magnet material;
- $D_s$ = Diameter of shaft on which the completed component will be mounted;
- $T_m$ = Thickness of magnet strip;
- $\pi$ = 3.1416;

The resultant length will provide extra material compression when inserted into the channel 8 of the metal cylinder 3. The optimum length of plastic magnetic material may be determined by trial fitting to determine a length which will be snugly compressed without buckling as the third and fourth rolling stages are performed. When used on a rotor, it will be desired to make the component slightly smaller than the rotor to assure a tight fit of the assembled component, said tight fit being affected by the amount of plastic material fitted into the cylinder 3.

Figure 7:
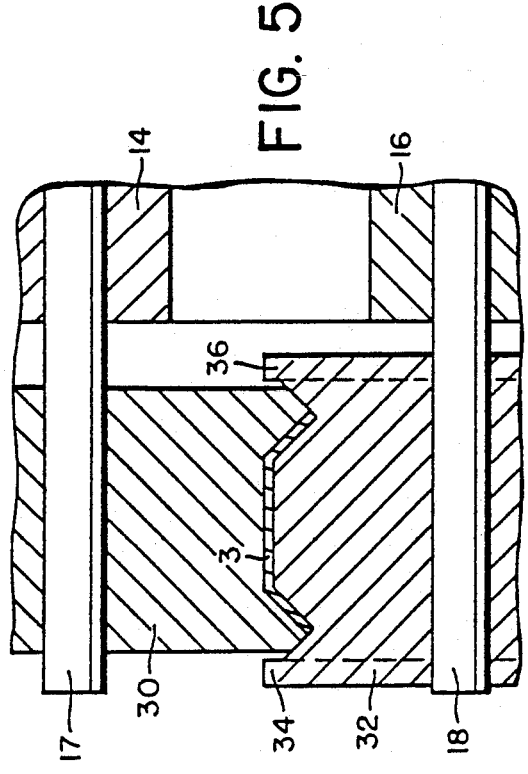
FIG. 7 depicts a sectional view of another set of upper and lower form rolls mounted on the form rolling apparatus to perform a third rolling stage used in making the steel wrapped non-metallic magnetic component in accordance with the principles of the present invention.

After the second rolling stage has been completed and the magnetic material 2 inserted into the channel 8, the metal cylinder 3 may be rolled in a third rolling stage. A third top roll 48 and third bottom roll 50 are affixed to the upper roll shaft 17 and lower roll shaft 18, respectively, to perform this rolling stage. FIG. 7 depicts the third top roll 48 and third bottom roll 50. The metal cylinder 3 is mounted on the bottom roll 50. By gradually lowering the third top roll 48 using the hand wheel 22, the third top roll 48 is lowered onto the third bottom roll 50. The axial ends of the metal cylinder are therefore deformed such that flanges 44, 46, which extended radially towards the bottom roll shaft and perpendicular with the remaining portion of the metal cylinder, are deformed into an intermediate position (shown in FIG. 7). After the third top roll 38 is gradually lowered to its lowest position, the metal cylinder 3 will be deformed into the shape shown in FIG. 7 and the third rolling stage completed. The flanges 44, 46 will be positioned at an angle of less than ninety degrees relative to the inner diameter of the magnetic material 2.

Figure 8:
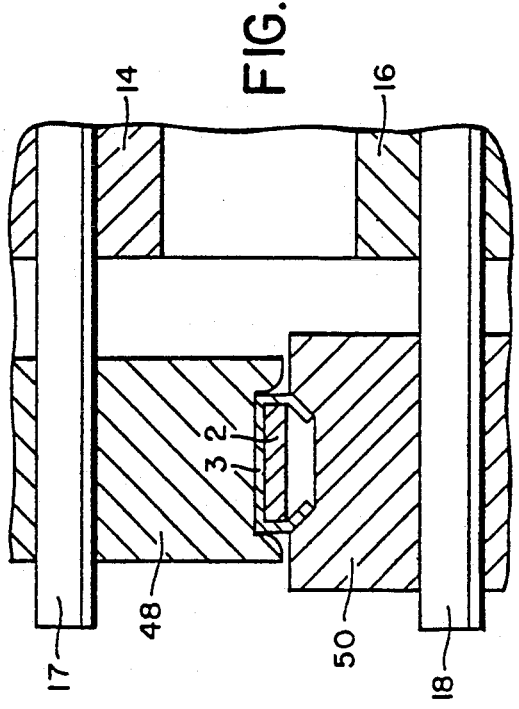
FIG. 8 depicts a sectional view of another set of upper and lower form rolls mounted on the form rolling apparatus to perform a fourth rolling stage used in making the steel wrapped non-metallic magnetic component in accordance with the principles of the present invention.

After the third rolling stage, a fourth rolling stage may be performed on the form rolling apparatus 4 using a fourth top roll 52 and a fourth bottom roll 54. FIG. 8 depicts the fourth top roll 52 and fourth bottom roll 54 useable in the fourth rolling stage. The metal cylinder 3 and magnetic material 2 are mounted on the fourth bottom roll 54. By turning the hand wheel 22 while the drive means rotates the rolls 52, 54, the fourth top roll 52 is gradually lowered onto the fourth bottom roll 54 and the axial ends of the metal cylinder are deformed such that flanges 44, 46 substantially parallel with the inner diameter of the magnetic material 2. After the fourth top roll is lowered to its lowest position onto the fourth bottom roll 54 and the rolls are spun by the drive means, the metal cylinder 3 will be as shown in FIG. 8 and the fourth rolling stage will be complete.

Each form rolling stage is performed by placing the cylinder 3 (and magnetic material if at the appropriate stage) on the lower roll. The top roll is then lowered to initially contact the outer diameter of the metal cylinder. The form rolling machine is activated such that the upper and lower shaft 17, 18 rotate thereby rotating the upper and lower form rolls. The rotation of the upper and lower form rolls will also rotate the metal cylinder 3 which is guided by the guide means 20 and roller 120. By gradually lowering the upper roll via the hand wheel 22 while the form rolls are rotating, the metal cylinder will deform into a shape which is dictated by the position of the upper and lower form rolls.

The upper and lower form rolls depicted in the drawings are comprised of one piece members. However, it will be apparent to one skilled in the art that the form rolls may be comprised of a plurality of discs which may be placed side by side on the upper or lower roll shafts 17, 18 to result in the desired cross-sectional configuration of the form rolls necessary to perform the first through fourth form rolling stages. Also, it will be apparent to one skilled in the art that additional or intermediate rolling stages not depicted herein may also be performed.

After the fourth rolling stage has been completed, the resultant structure will comprise the component depicted in FIG. 2 which may be mounted about a shaft or the like to impart magnetic properties thereto.

Although the invention has been described in connection with the embodiments depicted herein, the invention is not intended to be limited to these particular embodiments. Various modifications, changes and equivalents may be incorporated into these embodiments and are intended to be within the scope of the invention as defined by the following claims.

What is claimed is:

1. A metal wrapped non-metallic component useable about a rotor or a shaft comprising:
   a strip of sheet metal having its ends welded together to form a cylinder of sheet metal, said cylinder having first and second axial ends removed therefrom; a channel defined by an inner diameter of a central cylindrical portion of the cylinder, said axial ends, and first and second flanges integrally formed from said axial ends; and a magnetic component being secured within the channel, wherein the flanges are folded about sides of the magnetic component to contact an inner surface of the magnetic component.

2. A metal wrapped non-metallic magnetic component usable about a rotor or a shaft made by a process comprising the steps of:
   welding ends of a strip of sheet metal to form a cylinder of metal;
   form rolling the cylinder to deform a first axial end and a second axial end thereof radially inward to form a channel located along an inner diameter of the cylinder defined between the first and second flanges formed by the deformed first and second axial ends and a middle part of the cylinder;
   inserting a magnetic material within the channel between the deformed first and second axial ends;
   form rolling the cylinder such that the flanges are folded about sides of the magnetic material to contact an inner surface of the magnetic material.

3. A metal wrapped non-metallic magnetic component for use about a rotor or a shaft comprising:
   a ring of metal having two axial ends located radially inward from a central cylindrical portion of the ring wherein said axial ends and an inner surface of said central cylindrical portion define a channel and said axial ends further comprise a first flange protruding axially towards an opposed second flange; and
   a non-metallic magnetic material located within said channel between said axial ends and contacting said inner surface said non-metallic magnetic material being supported within said channel by said first and second flanges.

4. The metal wrapped non-metallic magnetic component for use about a rotor or shaft of claim 3 wherein said flanges are integrally formed from said axial ends.

* * * * *